United States Patent
Zhang

(10) Patent No.: US 9,706,179 B2
(45) Date of Patent: Jul. 11, 2017

(54) PROJECTION METHOD AND ELECTRONIC DEVICE

(71) Applicant: Lenovo (Beijing) Co., Ltd., Beijing (CN)

(72) Inventor: Xiaodan Zhang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/752,150

(22) Filed: Jun. 26, 2015

(65) Prior Publication Data

US 2016/0212392 A1    Jul. 21, 2016

(30) Foreign Application Priority Data

Jan. 19, 2015  (CN) .......................... 2015 1 0026027

(51) Int. Cl.
*G03B 21/30* (2006.01)
*G03B 21/14* (2006.01)
*H04N 9/31* (2006.01)
*G06F 3/01* (2006.01)

(52) U.S. Cl.
CPC ............... *H04N 9/31* (2013.01); *G06F 3/017* (2013.01); *H04N 9/3173* (2013.01); *H04N 9/3182* (2013.01); *H04N 9/3194* (2013.01); *G03B 21/145* (2013.01); *G03B 21/30* (2013.01)

(58) Field of Classification Search
CPC ...... G03B 21/145; G03B 21/30; G03B 21/14; H04N 9/3173; H04N 9/3176; H04N 9/3141

USPC ...................................................... 353/69, 70
See application file for complete search history.

(56) References Cited

U.S. PATENT DOCUMENTS

| 7,690,797 B2 * | 4/2010 | Higashi ................. G03B 21/53 353/101 |
| 8,666,446 B2 | 3/2014 | Kim |
| 2010/0099457 A1 | 4/2010 | Kim |
| 2012/0182307 A1 * | 7/2012 | Ueno ...................... G03B 21/14 345/589 |
| 2014/0139560 A1 | 5/2014 | Jung et al. |

FOREIGN PATENT DOCUMENTS

| CN | 101729658 A | 6/2010 |
| CN | 103823622 A | 5/2014 |

OTHER PUBLICATIONS

First Chinese Office Action regarding Application No. 201510026027.2 dated Feb. 23, 2017. English translation provided by http://globaldossier.uspto.gov.

* cited by examiner

*Primary Examiner* — William C Dowling
*Assistant Examiner* — Ryan Howard
(74) *Attorney, Agent, or Firm* — Harness, Dickey & Pierce, P.L.C.

(57) ABSTRACT

A projection method of an electronic device, the electronic device has projection module. The method includes: detecting motion information of the electronic device to obtain a motion parameter; determining whether the motion parameter meets a predetermined condition; and adjusting an operating state of the projection module to match a motion state of the electronic device if the motion parameter meets the predetermined condition.

9 Claims, 10 Drawing Sheets

PROJECTION METHOD AND ELECTRONIC DEVICE

CROSS REFERENCE TO RELATED APPLICATION

The present application claims the priority to Chinese Patent Application No. 201510026027.2, entitled "INFORMATION PROCESSING METHOD AND ELECTRONIC DEVICE", filed on Jan. 19, 2015 with the State Intellectual Property Office of People's Republic of China, which is incorporated herein by reference in its entirety.

FIELD

The disclosure relates to information processing technology, and in particular to a projection method and an electronic device.

BACKGROUND

An electronic device such as a smart phone, a tablet is often provided with a projection module to support projection display. When used by a user to perform projection display, the electronic device will inevitably be moved (for example, when user wants to adjust the position of the electronic device), and the projection module needs to be turned off to prevent projected light beam, which has a high brightness when performing the projection display, from being projected towards human eyes; and then the projection module needs to be restarted when necessary, resulting in tedious operations. In the prior art, there is no efficient solution by which the projected light beam may be prevented from being projected towards human eyes and the frequent switching on and off of the projection module may be omitted.

SUMMARY

A projection method and an electronic device are provided according to the embodiments of the present disclosure.

In an aspect, the embodiments provide a projection method of an electronic device having a projection unit, the method includes:

detecting motion information of the electronic device to obtain a motion parameter;

determining whether the motion parameter meets a predetermined condition; and adjusting an operating state of the projection module to match a motion state of the electronic device if the motion parameter meets the predetermined condition.

In another aspect, the embodiment of the present disclosure provide an electronic device, which includes:

a projection module; and a processor configured to:

detect motion information of the electronic device to obtain a motion parameter;

determine whether the motion parameter meets a predetermined condition; and adjust an operating state of the projection module to match a motion state of the electronic device if the motion parameter meets the predetermined condition.

DETAILED DESCRIPTION OF THE EMBODIMENTS

Figure 1:
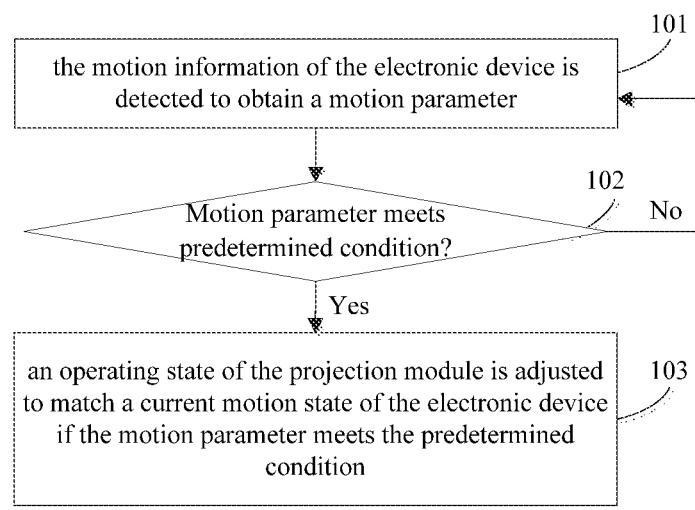
FIG. 1 is a schematic flow chart of an implementation of a projection method according to a first embodiment of the disclosure.

A projection method applicable to an electronic device including a projection module (where the electronic device can project content to a bearing surface with the projection module) is described in the embodiments of the disclosure. As shown in FIG. 1, in step 101, the motion information of the electronic device is detected to obtain a motion parameter. In step 102, it is determined whether the motion parameter meets a predetermined condition; step 103 is performed if the motion parameter meets the predetermined condition, and the process returns to step 101 if the motion parameter does not meet the predetermined condition. In step 103, an operating state of the projection module is adjusted to match a current motion state of the electronic device if the motion parameter meets the predetermined condition. In other words, it is determined, based on the motion parameter of the electronic device, whether to adjust the operating state of the projection module, therefore the operating state of the projection module may be adjusted according to different motion states of the electronic device.

For example, when the electronic device is in a motion state, the operating state of the projection module may be adjusted to stop projection, thereby preventing the projected light beam from being projected towards human eyes in the motion state of the electronic device and ensuring the user's security. The operating state of the projection module of the electronic device does not need to be adjusted manually by the user, therefore the time required for operating the electronic device is saved for the user, and the user experience is enhanced.

Hereinafter, the disclosure will be further explained in detail in conjunction with the appending drawings and the embodiments.

In a first embodiment, the projection module is adjusted to switch between a projection mode and a non-projection mode if the motion parameter meets the predetermined condition (the electronic device is switched between a motion state and a stationary state) (a combination scheme 1 of claim 2 and claim 3).

Figure 2A:
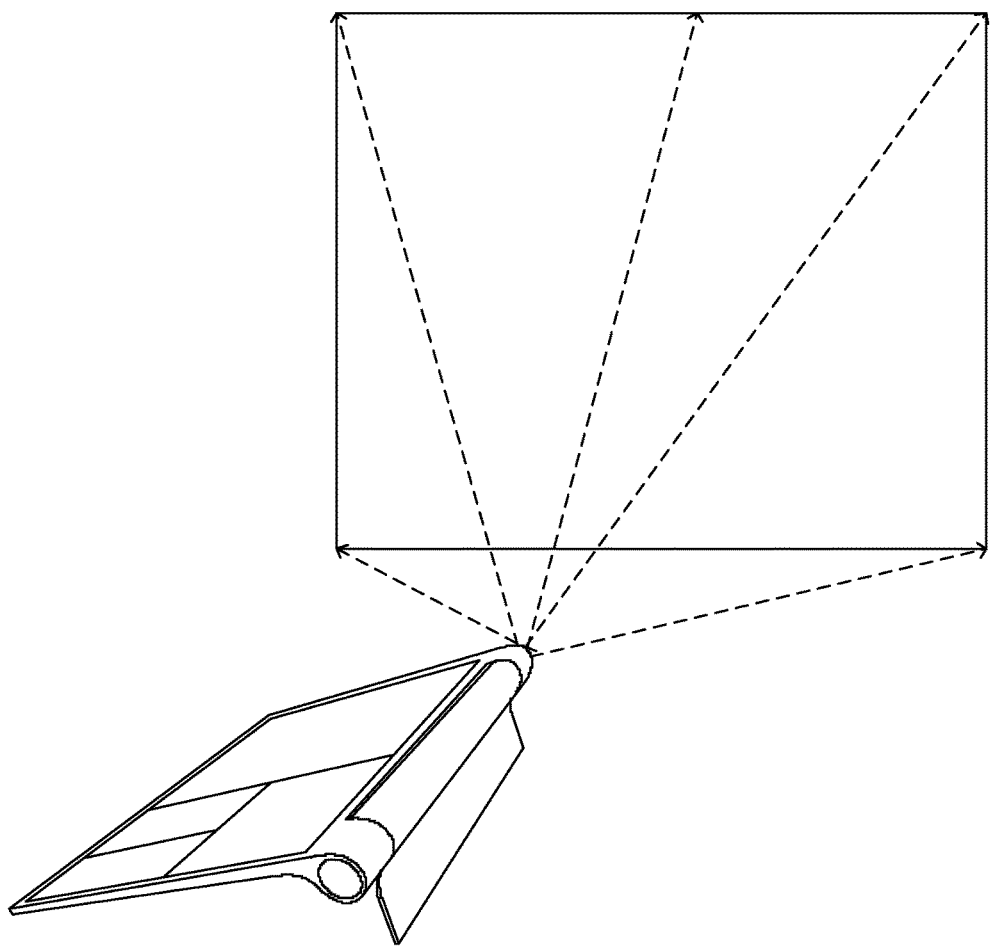
FIG. 2a is a schematic diagram of an electronic device performing projection display according to an embodiment of the disclosure.
Figure 2B:
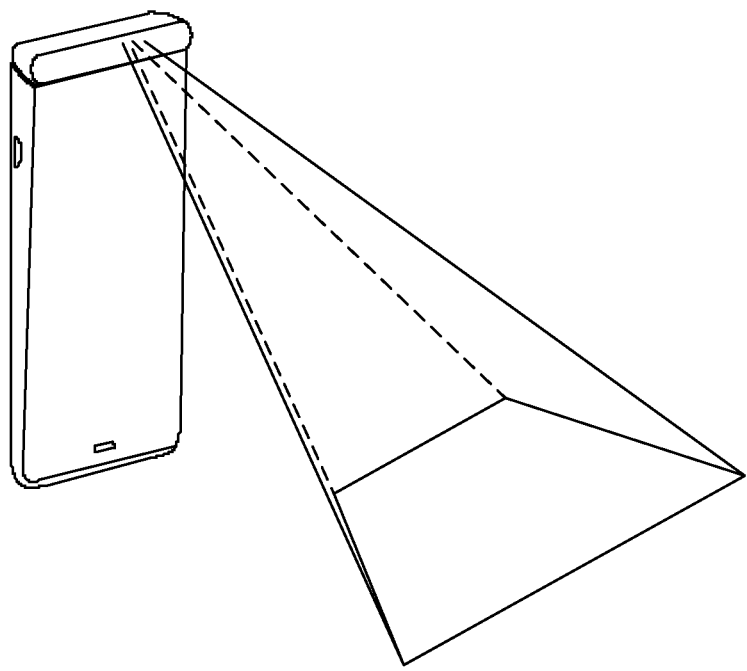
FIG. 2b is a schematic diagram of an electronic device performing projection display according to another embodiment of the disclosure.
Figure 3:
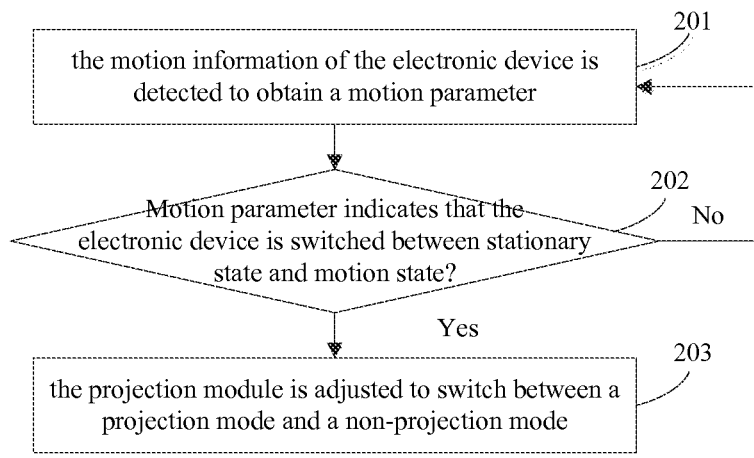
FIG. 3 is a schematic flow chart of an implementation of a projection method according to a second embodiment of the disclosure.

A projection method described in this embodiment is applicable to an electronic device such as a smart phone or a tablet. A projection module is provided in the electronic device. As shown in FIGS. 2a and 2b, the electronic device supports projecting content (for example, multimedia information or text information) to a bearing surface (for example, a table surface, a wall surface, or a projection screen) with the projection module. As shown in FIG. 3, the information processing method described in this embodiment includes the following steps 201 to 203.

In step 201, the motion information of the electronic device is detected to obtain a motion parameter.

In practice, the electronic device may obtain the motion parameter of the electronic device by analyzing sensor data output by a built-in sensor such as a gyroscope or a gravity sensor. The motion parameter may indicate at least one of the following information: whether the electronic device is moving, a moving speed of the electronic device, an acceleration of the electronic device; and a motion trajectory of the electronic device.

In step 202, it is determined whether the motion parameter indicates that the electronic device is switched between the stationary state and the motion state; step 203 is executed if the motion parameter indicates that the electronic device is switched between the stationary state and the motion state, which indicates that the motion parameter meets a predetermined condition; the process returns to step 201 where the motion information of the electronic device is detected to obtain a motion parameter if the motion parameter indicates that the electronic device is not switched between the stationary state and the motion state.

In step 203, the projection module is adjusted to switch between a projection mode and a non-projection mode.

In the case where the projection module is in the projection mode, if the motion parameter indicates that the electronic device is switched from the stationary state to the motion state, the projection module is switched from the projection mode to the non-projection mode, i.e., the projection display of the content on a bearing surface may be stopped by the display module, thereby preventing the projected light beam from being projected towards human eyes; if a subsequently obtained motion parameter indicates that the electronic device is switched to the stationary state again, the projection module may be switched from the non-projection mode to the projection mode, and the content which is previously stopped from projection may be resumed displaying on the bearing surface by the projection module, thereby ensuring continuity in displaying of the content; alternatively, the content to be projected may be determined according to a triggering operation of the user, and the content indicated by the triggering operation may be projected and displayed on the bearing surface.

For example, in the case where the motion parameter indicates that the electronic device is switched from the stationary state to the motion state when a multimedia content is played, the projection and displaying of the multimedia content on the bearing surface may be stopped by the projection module, and a current play progress of the multimedia content may be recorded. Then in the case where the motion parameter indicates that the electronic device is switched from the motion state to the stationary state, the multimedia content may be projected and displayed on the bearing surface by the projection module, and the multimedia content may be played from the point where it was stopped according to the play progress, thereby implementing continue-play of the multimedia content.

In a second embodiment, the projection module is adjusted to switch between a projection mode and a non-projection mode in the case where the motion parameter meets a predetermined condition (a motion amplitude exceeds a predetermined amplitude) (a combination scheme 2 of claim 2 and claim 3).

Figure 4:
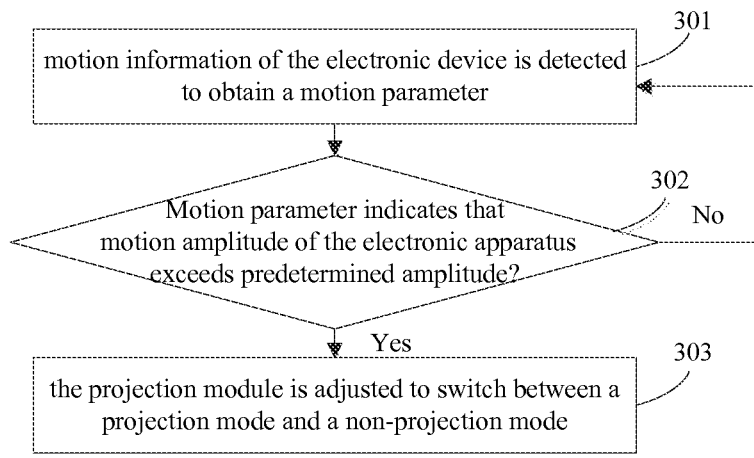
FIG. 4 is a schematic flow chart of an implementation of a projection method according to a third embodiment of the disclosure.

A projection method described in this embodiment is applicable to an electronic device such as a smart phone or a tablet. A projection module is provided in the electronic device. As shown in FIGS. 2a and 2b, the apparatus supports projecting content (for example, multimedia information or text information) to a bearing surface (for example, a table surface, a wall surface, or a projection screen) with the projection module. As shown in FIG. 4, the information processing method described in this embodiment includes the following steps 301 to 303.

In step 301, the motion information of the electronic device is detected to obtain a motion parameter.

In practice, the electronic device may obtain the motion parameter of the electronic device by analyzing sensor data output by a built-in sensor such as a gyroscope or a gravity sensor. The motion parameter may indicate at least one of the following information: whether the electronic device is moving, a moving speed of the electronic device, an acceleration of the electronic device; and a motion trajectory of the electronic device.

In step 302, it is determined whether the motion parameter indicates that a motion amplitude of the electronic apparatus exceeds a predetermined amplitude; step 303 is executed if the motion parameter indicates a motion amplitude of the electronic device exceeds a predetermined amplitude, which indicates that the motion parameter meets a predetermined condition; the process returns to step 301 where the motion information of the electronic device is detected to obtain a motion parameter if the motion parameter indicates a motion amplitude of the electronic device does not exceed a predetermined amplitude.

In step 303, the projection module is adjusted to switch between a projection mode and a non-projection mode.

In the case where the projection module is in the projection mode, if the motion parameter indicates a motion amplitude of the electronic device does not exceed a predetermined amplitude, it is indicated that the position and posture of the electronic device is moved with a small amplitude, which may be caused by the user adjusting a projection area or a projection direction of the projection module, or by the user moving the electronic device by accident. In the above conditions, the user does not wish the projection module to stop projection and display of the content. Therefore, the projection module is maintained in the projection mode. If the motion parameter indicates that the motion amplitude of the electronic device exceeds the predetermined amplitude, it is indicated that the electronic device is moved significantly, which may be caused by the user picking up the electronic device and forgetting to turn off the projection module. In this case, the projection module may be switched from the projection mode to the non-projection mode, i.e., the projection display of the content on a bearing surface may be stopped by the display module, thereby preventing the projected light beam from being projected towards human eyes; if a subsequently obtained motion parameter indicates that the motion amplitude of the electronic device is smaller than the predetermined amplitude (or the electronic device is switched back to the stationary state), the projection module may be switched from the non-projection mode to the projection mode, and the content which is previously stopped from projection may be resumed displaying on the bearing surface by the projection module, thereby keeping the continuity in the displaying of the content; alternatively, the content to be projected may be determined according to a triggering operation of the user, and the content indicated by the triggering operation may be projected and displayed on the bearing surface.

For example, in the case where the motion parameter indicates that the motion amplitude of the electronic device exceeds the predetermined amplitude when slides are played, the projection and displaying of the slides on the bearing surface may be stopped by the projection module, and a current play progress may be recorded. Then in the case where the motion parameter indicates that the motion amplitude of the electronic device is smaller than the predetermined amplitude (or the electronic device is switched to the stationary state), the slides may be projected and displayed on the bearing surface by the projection module, and the slides may be played from the point where they were stopped according to the play progress, thereby implementing continue-play of the slides.

In a fourth embodiment, the projection parameter of the projection module is adjusted if the motion parameter meets the predetermined condition (the electronic device is switched between the motion state and the stationary state). (A combination scheme 3 of claim 2 and claim 3, in conjunction with claim 8 and claim 9.)

Figure 5:
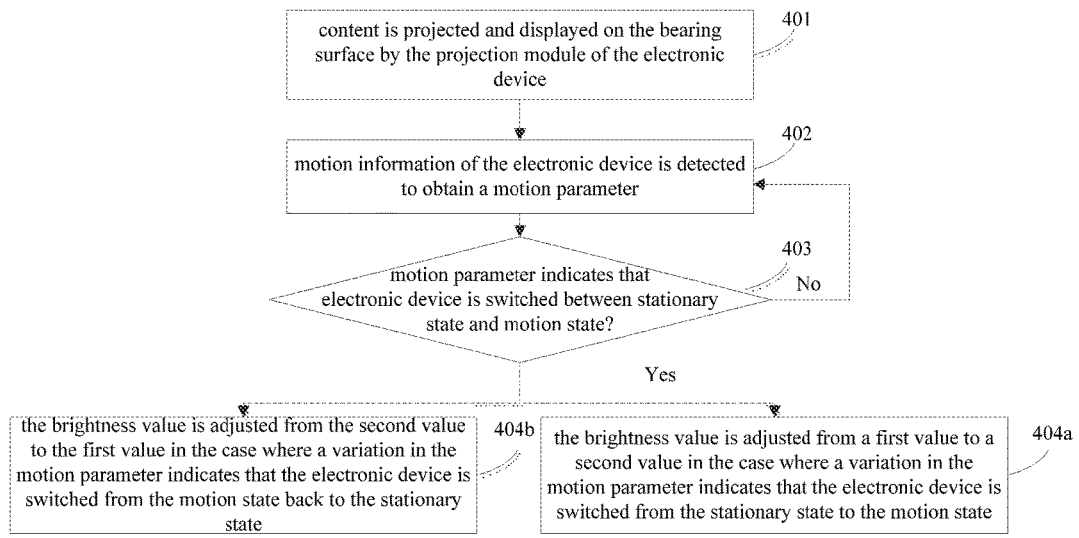
FIG. 5 is a schematic flow chart of an implementation of a projection method according to a fourth embodiment of the disclosure.

A projection method described in this embodiment is applicable to an electronic device such as a smart phone or a tablet. A projection module is provided in the electronic device. As shown in FIGS. 2*a* and 2*b*, the apparatus supports projecting content (for example, multimedia information or text information) to a bearing surface (for example, a table surface, a wall surface, or a projection screen) with the projection module. As shown in FIG. 5, the information processing method described in this embodiment includes the following steps 401 to 404.

In step 401, the content is projected and displayed on the bearing surface by the projection module of the electronic device.

In step 402, the motion information of the electronic device is detected to obtain a motion parameter.

In practice, the electronic device may obtain the motion parameter of the electronic device by analyzing sensor data output by a built-in sensor such as a gyroscope or a gravity sensor. The motion parameter may indicate at least one of the following information: whether the electronic device is moving, a moving speed of the electronic device, an acceleration of the electronic device; and a motion trajectory of the electronic device.

In step 403, it is determined whether the motion parameter indicates that the electronic device is switched between the stationary state and the motion state; step 404*a* or step 404*b* is executed if the motion parameter indicates that the electronic device is switched between the stationary state and the motion state, the process returns to step 402 where the motion information of the electronic device is detected to obtain a motion parameter if the motion parameter indicate the electronic device is not switched between the stationary state and the motion state.

Subsequently, a projection parameter of the projection module is adjusted in the case where it is determined in step 403 that the motion parameter indicates that the electronic device is switched between the stationary state and the motion state. The case where the projection parameter is a brightness value, which represents the brightness of the light beam projected from the projection module, is taken as an example. In practice, the projection parameter may also be a projection direction for the projection module to perform the projection display.

In step 404*a*, the brightness value is adjusted from a first value (brightness value before the adjustment) to a second value in the case where a variation in the motion parameter indicates that the electronic device is switched from the stationary state to the motion state, where the first value is greater than the second value.

When the variation in the motion parameter indicates that the electronic device is switched from the stationary state to the motion state, which may be caused by the user holding the electronic device and forgetting to turn off the projection module, the brightness value is adjusted from a first value to a second value which is smaller than the first value thereby preventing the projected light beam from being projected towards human eyes. The second value may be the brightness value when the light resource of the projection module is approximately closed to avoid the projected light beam being projected towards human eyes.

In step 404*b*, the brightness value is adjusted from the second value to the first value in the case where a variation in the motion parameter indicates that the electronic device is switched from the motion state back to the stationary state.

It should be noted that, in step 404*a*, in the case where the brightness value used by the projection module in performing the projection is adjusted from the first value to the second value, the following processes may be adopted if the content projected and displayed on the bearing surface with the first value by the projection module is dynamic (for example, a movie).

1) The content may be projected and displayed continuously on the bearing surface with the second value by the projection module. For example, in the case where a multimedia content is projected and displayed with the projection module, the content may be projected and displayed continuously on the bearing surface with the second value by the projection module when the electronic device is switched from the stationary state to the motion state. The following technical effect may be achieved: the content may be projected and displayed continuously on the bearing surface by the projection module when the electronic device is switched from the stationary state to the motion state; meanwhile, the brightness value of the content projected and displayed is reduced to a brightness which will not cause damage to human eyes.

2) A stationary screen of the content is projected and displayed with the second value by the projection module. The stationary screen of the content is a snapshot of the content projected and displayed by the projection module at the time point when the electronic is switched from the stationary state to the motion state, that is, the content is stopped from being projected and displayed dynamically and only a stationary screen is projected and displayed. In step 404b, when the variation in the motion parameter indicates that the electronic device is switched from the motion state back to the stationary state, the brightness value is adjusted from the second value to the first value. The content continues to be projected and displayed on the bearing surface with the first value by the projection module based on the stationary screen, that is, the content continues to be displayed on the bearing surface with the progress where the content was stopped from projected and displayed dynamically.

For example, in the case where a multimedia content is projected and displayed by the projection module, if the variation in the motion parameter indicates that the electronic device is switched from the stationary state to the motion state when the play progress of the multimedia content reaches 20%, the stationary screen corresponding to the multimedia content played at 20% progress is projected and displayed with the second value by the projection module (i.e., the stationary screen is projected and displayed with a brightness which will not cause damage to human eyes). When the variation in the motion parameter indicates that the electronic device is switched from the motion state to the stationary state, the multimedia content continues to be projected and displayed with the first value from the 20% progress by the projection module. Therefore the following technical effect is achieved: the projection module does not need to be turned off before the user moves the electronic device to adjust the projection direction and/or projection area, the brightness of the light beam projected from the projection module may be reduced by the electronic device automatically. After the user finishing the adjustment, the brightness of the light beam projected from the projection module may be restored to continue with the projection and display of the content, thereby preventing the intense projected beam from being projected towards human eyes, user operation may be simplified and the user experience is enhanced.

In a fifth embodiment, the projection parameter of the projection module is adjusted if the motion parameter meets the predetermined condition (the electronic device is switched between the motion state and the stationary state).

Figure 6:
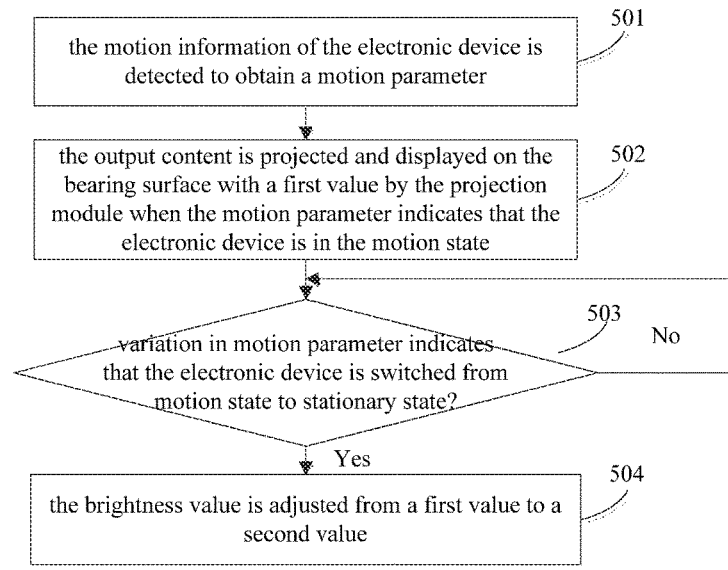
FIG. 6 is a schematic flow chart of an implementation of a projection method according to a fifth embodiment of the disclosure.

A projection method described in this embodiment is applicable to an electronic device such as a smart phone or a tablet. A projection module is provided in the electronic device. As shown in FIGS. 2a and 2b, the apparatus supports projecting content (for example, multimedia information or text information) to a bearing surface (for example, a table surface, a wall surface, or a projection screen) with the projection module. As shown in FIG. 6 the information processing method described in this embodiment includes the following steps 501 to 504.

In step 501, the motion information of the electronic device is detected to obtain a motion parameter.

In practice, the electronic device may obtain the motion parameter of the electronic device by analyzing sensor data output by a built-in sensor such as a gyroscope or a gravity sensor periodically. The motion parameter may indicate at least one of the following information: whether the electronic device is moving, a moving speed of the electronic device, an acceleration of the electronic device; and a motion trajectory of the electronic device.

In step 502, the output content is projected and displayed on the bearing surface with a first value by the projection module when the motion parameter indicates that the electronic device is in the motion state.

The projection parameter of the projection module is adjusted in step 502. Here, the case where the projection parameter is the brightness value is taken as an example. The brightness value indicates the brightness of the light beam projected from the projection module, and the first value indicates brightness of the light beam projected from the projection module, where the first value indicates a brightness at which the light beam is projected to human eyes and will not cause damage to human eyes, thereby preventing human eyes from being damaged when a user moves the electronic device and forgets to turn off the projection module.

In step 503, it is determined whether the variation in the motion parameter indicates that the electronic device is switched from the motion state to the stationary state; step 504 is executed in the case where the variation in the motion parameter indicates that the electronic device is switched from the motion state to the stationary state; and if the variation in the motion parameter indicates that the electronic device is not switched from the motion state to the stationary state, the motion parameter continues to be acquired and it is determined whether the variation in the motion parameter indicates that the electronic device is switched from the motion state to the stationary state.

The motion parameter, which is the basis of the determination in step 503, is obtained after the output content is projected and displayed on the bearing surface with the second value by the projection module. In the subsequent steps, in the case where it is determined in step 503 the variation in the motion parameter indicates that the electronic device is switched from the motion state to the stationary state, the projection parameter of the projection module is adjusted. Here, the case where the projection parameter is the brightness value is taken as an example. The brightness value indicates the brightness of the light beam projected from the projection module.

In step 504, the brightness value is adjusted from a first value (brightness value before the adjustment) to a second value in the case where a variation in the motion parameter indicates that the electronic device is switched from the motion state to the stationary state, where the first value is smaller than the second value.

The second value indicates a ordinary brightness value which is used when the content is projected and displayed on the bearing surface by the projection module. Since a reflected light beam of the projected light beam should be bright enough for person's eyes to see the content, the brightness indicated by the second value should be greater than the brightness indicated by the first value.

It should be noted that, in step 501, in the case where the motion parameter indicates that the electronic device is in the motion state, and the brightness value used by the projection module when performing projection and display is the first value, the following processes may be adopted if the output content projected and displayed on the bearing surface with the first value by the projection module is dynamic (for example, a movie).

1) In the case where the motion parameter indicates that the electronic device is in the motion state, the content continues to be projected and displayed on the bearing surface with the first value by the projection module. For example, in the case where multimedia content is projected and displayed by the projection module, the content is projected and displayed continuously on the bearing surface with the first value by the projection module if the electronic device is in the motion state. The following technical effect may be achieved: the content may be projected and displayed continuously on the bearing surface by the projection module when the electronic device is in the motion state; meanwhile, the brightness value of the content projected and displayed is reduced to a brightness which will not cause damage to human eyes.

2) In the case where the motion parameter indicates that the electronic device is in the motion state, a stationary screen of the content is projected and displayed with the first value by the projection module. The stationary screen of the content is a snapshot of the content projected and displayed by the projection module at the time point when the electronic is switched from the stationary state to the motion state, that is, the content is stopped from being projected and displayed dynamically and only a stationary screen is projected and displayed. In step 504, when the variation in the motion parameter indicates that the electronic device is switched from the motion state back to the stationary state, the brightness value is adjusted from the first value to the second value. The content continues to be projected and displayed on the bearing surface with the second value by the projection module based on the stationary screen, that is, the content continues to be displayed on the bearing surface with the progress where the content was stopped from projected and displayed dynamically.

For example, in the case where a multimedia content is projected and displayed by the projection module, if the variation in the motion parameter indicates that the electronic device is switched from the stationary state to the motion state when the play progress of the multimedia content reaches 20%, the stationary screen corresponding to the multimedia content played at 20% progress is projected and displayed with the first value by the projection module (i.e., the stationary screen is projected and displayed with a brightness which will not cause damage to human eyes.). When the variation in the motion parameter indicates that the electronic device is switched from the motion state to the stationary state, the multimedia content continues to be projected and displayed with the second value from the 20% progress by the projection module thereby the user may see the multimedia content clearly. Therefore the following technical effect is achieved. When the electronic device is in the motion state and the projection module is turned on, the brightness of the light beam projected from the projection module may be reduced automatically (i.e. the content is projected and displayed on the bearing surface with the first value); when the electronic device is switched from the motion state to the stationary state, the brightness of the light beam projected from the projection module may be increased to continue with the projection and display of the output content (i.e. the content is projected and displayed on the bearing surface with the second value), thereby the content projected and displayed may be seen by the person's eyes clearly, and the intense light beam is prevented from being projected towards human eyes when the electronic device is in the motion state. In addition, the projection module does not need to be adjusted manually by the user, user operation may be simplified and the user experience is enhanced.

In a sixth embodiment, the projection module is controlled to be in a non-projection state in the case where a variation in the motion parameter indicates that the electronic device is switched from a stationary state to a motion state (claim 4).

Figure 7:
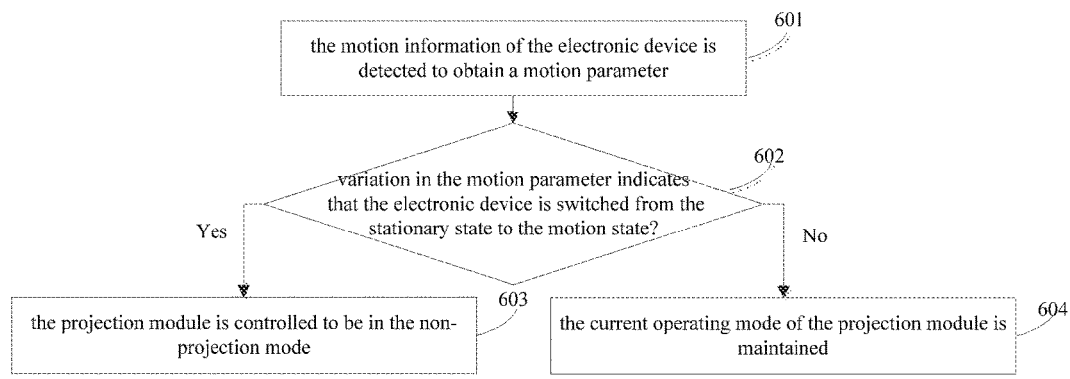
FIG. 7 is a schematic flow chart of an implementation of a projection method according to a sixth embodiment of the disclosure.

A projection method described in this embodiment is applicable to an electronic device such as a smart phone or a tablet. A projection module is provided in the electronic device. As shown in FIGS. 2a and 2b, the apparatus supports projecting content (for example, multimedia information or text information) to a bearing surface (for example, a table surface, a wall surface, or a projection screen) with the projection module. As shown in FIG. 7 the information processing method described in this embodiment includes the following steps 601 to 604.

In step 601, the motion information of the electronic device is detected to obtain a motion parameter.

In practice, the electronic device may obtain the motion parameter of the electronic device by periodically analyzing sensor data output by a built-in sensor such as a gyroscope or a gravity sensor. The motion parameter may indicate at least one of the following information: whether the electronic device is moving, a moving speed of the electronic device, an acceleration of the electronic device; and a motion trajectory of the electronic device.

In step 602, it is determined whether a variation in the motion parameter indicates that the electronic device is switched from the stationary state to the motion state. Step 603 is executed if the variation in the motion parameter indicates that the electronic device is switched from the stationary state to the motion state, step 604 is executed if the variation in the motion parameter indicates that the electronic device is not switched from the stationary state to the motion state.

In step 603, the projection module is controlled to be in the non-projection mode.

Step 603 includes the following two conditions.

1) when the variation in the motion parameter indicates that the electronic device is switched from the stationary state to the motion state, the projection module is in the non-projection mode where no light beam is projected by the projection module. In this case, the projection module is maintained in the non-projection mode to avoid the light beam projected from the projection module being projected towards human eyes.

2) when the variation in the motion parameter indicates that the electronic device is switched from the stationary state to the motion state, the projection module is in the projection mode where the content is projected and displayed on the bearing surface by the projection module. In this case, the projection module is controlled to switch from the projection mode to the non-projection mode, i.e., the projection module is stopped from projecting the light beam to avoid the light beam projected from the projection module being projected towards human eyes.

In step 604, the current operating mode of the projection module is maintained.

For example, in the case where the projection module is in the projection mode, the projection module is maintained in the projection mode to project and display the content on the bearing surface. In the case where the projection module is in the non-projection mode, the projection module is maintained in the non-projection mode to avoid the light beam projected from the projection module being projected towards human eyes. In addition, an instruction triggering the projection module to be switched to the projection mode may be screened until the variation in the motion parameter indicates that the electronic device is switched from the motion state to the stationary state, thereby preventing the projected light beam from being projected towards human eyes when the electronic device is in the motion state.

It should be noted that, steps 601 to 604 may be executed periodically, thereby the determination whether the electronic device is switched from the stationary state to the motion state may be made timely and a corresponding process may be performed, as explained below by way of examples.

1) The motion parameter is obtained when the content is projected and displayed on the bearing surface by the projection module. In the case where the variation in the motion parameter indicates that the electronic device is switched from the stationary state to the motion state, the projection module is switched to the non-projection mode to avoid the light beam projected from the projection module being projected towards human eyes.

2) The motion parameter is obtained when the projection module is in the non-projection mode where no content is projected and displayed on the bearing surface by the projection module. In the case where the variation in the motion parameter indicates that the electronic device is switched from the stationary state to the motion state, the projection module is maintained in the non-projection mode to avoid the light beam projected from the projection module being projected towards human eyes. In addition, the instruction triggering the projection module to be switched to the projection mode may be screened until the variation in the motion parameter indicates that the electronic device is switched from the motion state to the stationary state.

This embodiment may achieve the following technical effect. The projection module is ensured in the non-projection mode when the electronic device is switched from the stationary state to the motion state. For example the projection module may be controlled to switch to the non-projection mode when the projection module is in the projection module, thereby preventing the projected light beam from being projected towards human eyes when the user forget to turn off the projection module. The user is not required to adjust the projection module manually, and the time required for operating may be saved.

In a seventh embodiment, the projection module is controlled to be in a non-projection state in the case where a variation in the motion parameter indicates that the electronic device is switched from the stationary state to the motion state (claim 4 in combination with claim 5).

Figure 8:
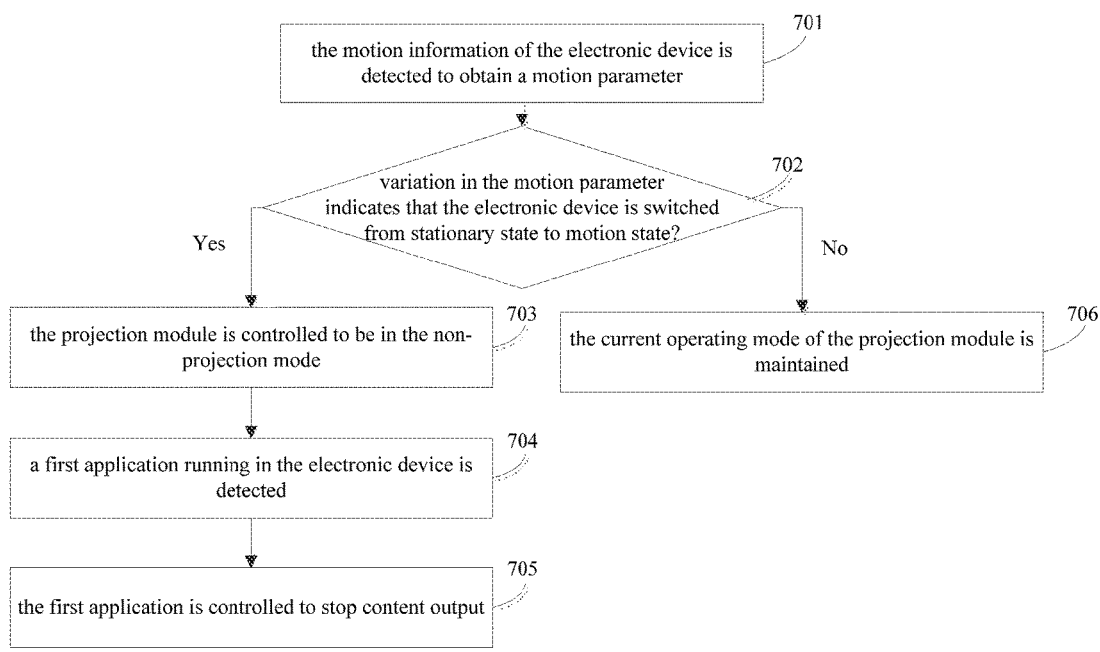
FIG. 8 is a schematic flow chart of an implementation of a projection method according to a seventh embodiment of the disclosure.

A projection method described in this embodiment is applicable to an electronic device such as a smart phone or a tablet. A projection module is provided in the electronic device. As shown in FIGS. 2*a* and 2*b*, the apparatus supports projecting content (for example, multimedia information or text information) to a bearing surface (for example, a table surface, a wall surface, or a projection screen) with the projection module. As shown in FIG. 8 the information processing method described in this embodiment includes the following steps 701 to 706.

In step 701, the motion information of the electronic device is detected to obtain a motion parameter.

In practice, the electronic device may obtain the motion parameter of the electronic device by periodically analyzing sensor data output by a built-in sensor such as a gyroscope or a gravity sensor. The motion parameter may indicate at least one of the following information: whether the electronic device is moving, a moving speed of the electronic device, an acceleration of the electronic device; and a motion trajectory of the electronic device.

In step 702, it is determined whether a variation in the motion parameter indicates that the electronic device is switched from the stationary state to the motion state. Steps 703 to 705 are executed if the variation in the motion parameter indicates that the electronic device is switched from the stationary state to the motion state, step 706 is executed if the variation in the motion parameter indicates that the electronic device is not switched from the stationary state to the motion state.

In step 703, the projection module is controlled to be in the non-projection mode.

Step 703 includes the following two conditions.

1) The projection module is in the non-projection mode where no light beam is projected by the projection module when the variation in the motion parameter indicates that the electronic device is switched from the stationary state to the motion state. In this case, the projection module is maintained in the non-projection mode to avoid the light beam projected from the projection module being projected towards human eyes.

2) The projection module is in the projection mode where the content is projected and displayed on the bearing surface by the projection module when the variation in the motion parameter indicates that the electronic device is switched from the stationary state to the motion state. In this case, the projection module is controlled to switch from the projection mode to the non-projection mode, where the projection module is stopped from projecting the light beam to avoid the light beam projected from the projection module being projected towards human eyes.

In step 704, a first application running in the electronic device is detected.

The first application is the application the content of which is projected and displayed by the projection module, such as a multimedia player or a game application.

In step 705, the first application is controlled to stop content output.

For example, in the case where the first application is a video player playing a movie, the video player is triggered to pause. In the case where the first application is a game application, the state where the game application stops running and the game screen becomes static is triggered.

In step 706, the current operating mode of the projection module is maintained.

For example, in the case where the projection module is in the projection mode, the projection module is maintained in the projection mode to project and display the content on the bearing surface. In the case where the projection module is in the non-projection mode, the projection module is maintained in the non-projection mode to avoid the light beam projected from the projection module being projected towards human eyes.

It should be noted that, steps 701 to 706 may be executed periodically, thereby the determination whether the electronic device is switched from the stationary state to the motion state may be made timely and a corresponding process may be performed, as explained below by way of examples.

1) The motion parameter is obtained when the video played by the video player is projected and displayed on the bearing surface by the projection module. In the case where the variation in the motion parameter indicates that the electronic device is switched from the stationary state to the motion state, the projection module is switched to the non-projection mode to avoid the light beam projected from the projection module being projected towards human eyes. At the same time, the video player is controlled to pause.

2) The motion parameter is obtained when the game screen of the game application is projected and displayed on the bearing surface by the projection module. In the case where the variation in the motion parameter indicates that the electronic device is switched from the stationary state to the motion state, the projection module is switched to the non-projection mode to avoid the light beam projected from the projection module being projected towards human eyes. At the same time, the state where the game application stops running and the game screen becomes static may be triggered.

In an eighth embodiment, the projection module is controlled to be in a projection state in the case where a variation in the motion parameter indicates that the electronic device is switched from the motion state to the stationary state (claim 4).

Figure 9:
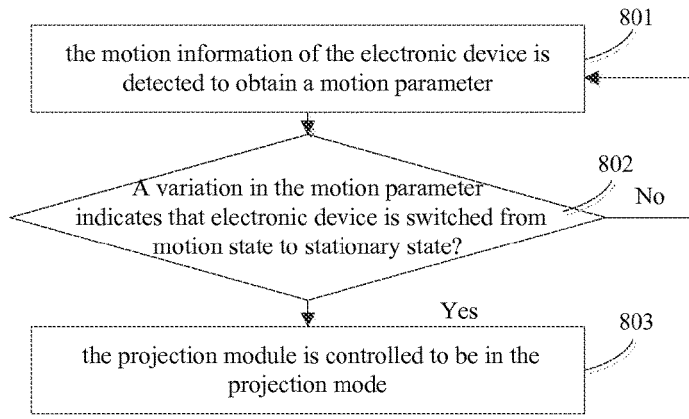
FIG. 9 is a schematic flow chart of an implementation of a projection method according to an eighth embodiment of the disclosure.

A projection method described in this embodiment is applicable to an electronic device such as a smart phone or a tablet. A projection module is provided in the electronic device. As shown in FIGS. 2a and 2b, the apparatus supports projecting content (for example, multimedia information or text information) to a bearing surface (for example, a table surface, a wall surface, or a projection screen) with the projection module. As shown in FIG. 9 the information processing method described in this embodiment includes the following steps 801 to 803.

In step 801, the motion information of the electronic device is detected to obtain a motion parameter.

In practice, the electronic device may obtain the motion parameter of the electronic device by periodically analyzing sensor data output by a built-in sensor such as a gyroscope or a gravity sensor. The motion parameter may indicate at least one of the following information: whether the electronic device is moving, a moving speed of the electronic device, an acceleration of the electronic device; and a motion trajectory of the electronic device.

In step 802, it is determined whether a variation in the motion parameter indicates that the electronic device is switched from the motion state to the stationary state. Step 803 is executed if the variation in the motion parameter indicates that the electronic device is switched from the motion state to the stationary state, the process returns to step 801 if the variation in the motion parameter indicates that the electronic device is not switched from the motion state to the stationary state.

In step 803, the projection module is controlled to be in the projection mode.

Step 803 includes the following two conditions.

In a first condition, in the case where the projection module is in the non-projection mode when the electronic device is previously in the motion state, when the variation in the motion parameter indicates that the electronic device is switched from the motion state to the stationary state, the projection module may be controlled to switch from the non-projection mode to the projection mode. (Alternatively, when a variation in the motion parameter indicates that the electronic device is switched from the motion state to the stationary state, and when an instruction which enables the projection module is received, the projection module may be controlled to switch from the non-projection mode to the projection mode.)

In a second condition, in the case where the projection module is in the projection mode when the electronic device is previously in the motion state, when the variation in the motion parameter indicates that the electronic device is switched from the motion state to the stationary state, the projection module may be controlled to switch from the non-projection mode to the projection mode to continue with the projection and display of the content on the bearing surface by the projection module.

It should be noted that, the above mentioned steps may be executed periodically, thereby the determination whether the electronic device is switched between the stationary state and the motion state may be made timely and a corresponding process may be performed.

This embodiment may achieve the following technical effect. In the case where the projection module is in the projection mode when the electronic device is previously in the stationary state, when electronic device is switched from the motion state to the stationary state, the projection module may be controlled to switch from the non-projection mode to the projection mode to continue with the projection and display of the content by the projection module. In the case where the projection module is in the non-projection mode when the electronic device is previously in the stationary state, when electronic device is switched from the motion state to the stationary state, the projection module may be controlled to maintain the non-projection mode until the instruction which triggers the projection module to be switched to the projection mode is received, and the projection module is switched from the non-projection mode to the projection mode.

In a ninth embodiment, the projection module is controlled to be in a non-projection state in the case where a variation in the motion parameter indicates that the electronic device is switched from the stationary state to the motion state; and the projection module is controlled to be in a projection state in the case where a variation in the motion parameter indicates that the electronic device is switched from the motion state to the stationary state (claim 4 in combination with claim 6).

Figure 10:
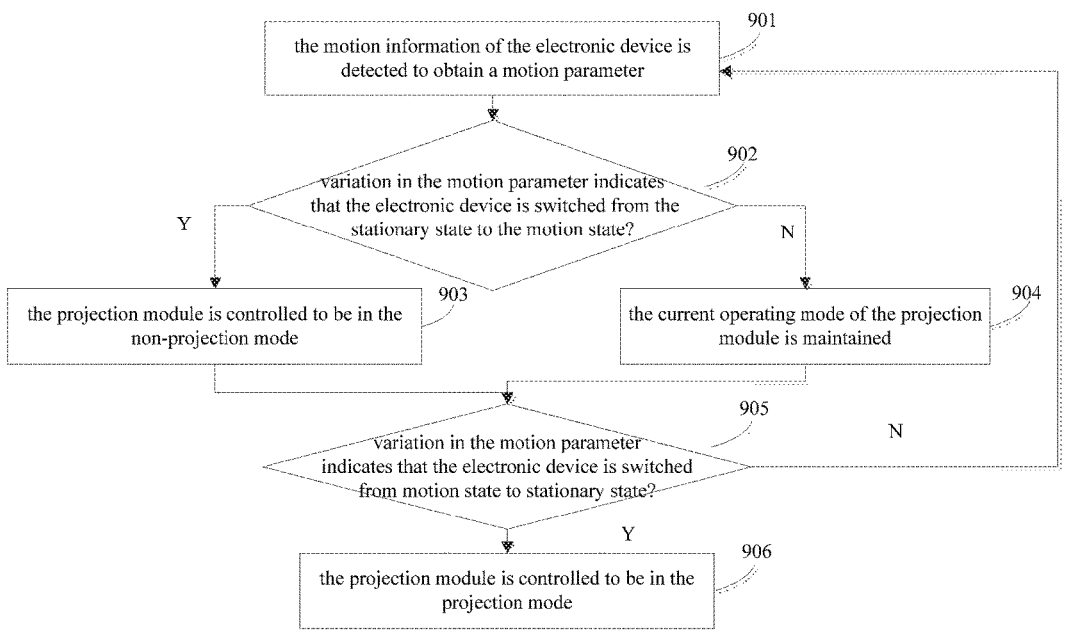
FIG. 10 is a schematic flow chart of an implementation of a projection method according to a ninth embodiment of the disclosure.

A projection method described in this embodiment is applicable to an electronic device such as a smart phone or a tablet. A projection module is provided in the electronic device. As shown in FIGS. 2a and 2b, the apparatus supports projecting content (for example, multimedia information or text information) to a bearing surface (for example, a table surface, a wall surface, or a projection screen) with the projection module. As shown in FIG. 10 the information processing method described in this embodiment includes the following steps 901 to 906.

In step 901, the motion information of the electronic device is detected to obtain a motion parameter.

In practice, the electronic device may obtain the motion parameter of the electronic device by periodically analyzing sensor data output by a built-in sensor such as a gyroscope or a gravity sensor. The motion parameter may indicate at least one of the following information: whether the electronic device is moving, a moving speed of the electronic device, an acceleration of the electronic device; and a motion trajectory of the electronic device.

In step 902, it is determined whether a variation in the motion parameter indicates that the electronic device is switched from the stationary state to the motion state. Step 903 is executed if the variation in the motion parameter indicates that the electronic device is switched from the stationary state to the motion state; step 904 is executed if the variation in the motion parameter indicates that the electronic device is not switched from the stationary state to the motion state.

In step 903, the projection module is controlled to be in the non-projection mode.

Step 903 includes the following two conditions, as explained below by way of examples.

In a first condition, when the variation in the motion parameter indicates that the electronic device is switched from the stationary state to the motion state, the projection module is in the non-projection mode where no light beam is projected by the projection module. In this case, the projection module is maintained in the non-projection mode to avoid the light beam projected from the projection module being projected towards human eyes.

In a second condition, when the variation in the motion parameter indicates that the electronic device is switched from the stationary state to the motion state, the projection module is in the projection mode where the content is projected and displayed on the bearing surface by the projection module. In this case, the projection module is controlled to switch from the projection mode to the non-projection mode, where the projection module is stopped from projecting the light beam to avoid the light beam projected from the projection module being projected towards human eyes.

In step 904, the current operating mode of the projection module is maintained.

For example, in the case where the projection module is in the projection mode, the projection module is maintained in the projection mode to project and display the content on the bearing surface. In the case where the projection module is in the non-projection mode, the projection module is maintained in the non-projection mode to avoid the light beam projected from the projection module being projected towards human eyes.

In step 905, the motion information of the electronic device is detected in continuation to obtain a motion parameter; then it is determined whether a variation in the motion parameter indicates that the electronic device is switched from the motion state to the stationary state. Step 906 is executed if the variation in the motion parameter indicates that the electronic device is switched from the motion state to the stationary state; the process returns to step 901 if the variation in the motion parameter indicates that the electronic device is not switched from the motion state to the stationary state.

In step 906, the projection module is controlled to be in the projection mode.

Step 906 also includes the following two conditions corresponding to the two conditions of step 903.

Corresponding to the above first condition where the projection module is in the non-projection mode when the variation in the motion parameter indicates that the electronic device is switched from the stationary state to the motion state, when a subsequent variation in the motion parameter indicates that the electronic device is switched from the motion state to the stationary state, the projection module may be controlled to switch from the non-projection mode to the projection mode. (Alternatively, when a subsequent variation in the motion parameter indicates that the electronic device is switched from the motion state to the stationary state, and when an instruction which enables the projection module is received, the projection module may be controlled to switch from the non-projection mode to the projection mode.)

Corresponding to the above second condition where the projection module is in the projection mode when the variation in the motion parameter indicates that the electronic device is switched from the stationary state to a motion state, when a subsequent variation in the motion parameter indicates that the electronic device is switched from the motion state to the stationary state, the projection module may be controlled to switch from the non-projection mode to the projection mode to continue with the projection and display of the content on the bearing surface by the projection module.

It should be noted that, the above steps may be executed periodically, thereby the determination whether the electronic device is switched between the stationary state and the motion state may be made timely and a corresponding process may be performed, as explained below by way of examples.

1) The motion parameter is obtained when the content is projected and displayed on the bearing surface by the projection module of the electronic device. In the case where the variation in the motion parameter indicates that the electronic device is switched from the stationary state to a motion state, the projection module is switched to the non-projection mode to avoid the light beam projected from the projection module being projected towards human eyes. Subsequently, in the case where the variation in the motion parameter indicates that the electronic device is switched from the motion state to the stationary state, the projection module is switched from the non-projection mode to the projection mode to continue with the projection and display of the content on the bearing surface by the projection module.

2) The motion parameter is obtained when the projection module is in the non-projection mode where the content is not projected and displayed on the bearing surface by the projection module of the electronic device. In the case where the variation in the motion parameter indicates that the electronic device is switched from the stationary state to the motion state, the projection module is maintained in the non-projection mode to avoid the light beam projected from the projection module being projected towards human eyes. In addition, the instruction enabling the projection module to be switched to the projection mode may be screened until the variation in the motion parameter indicates that the electronic device is switched from the motion state to the stationary state. At this moment, the projection module is controlled to switch from the non-projection mode to the projection mode in the case where the instruction enabling the projection module is received, thereby the content may be projected and displayed on the bearing surface by the projection module.

This embodiment may achieve the following technical effect. The projection module is ensured in the non-projection mode when the electronic device is switched from the stationary state to the motion state. For example the projection module may be controlled to switch to the non-projection mode when the projection module is in the projection mode, and the instruction triggering the projection module to be switched to the projection mode may be screened. In the case where the projection module is in the projection mode when the electronic device is in the stationary state, when electronic device is switched from the motion state to the stationary state, the projection module may be controlled to switch from the non-projection mode to the projection mode to continue with the projection and display of the content by the projection module. In the case where the projection module is in the non-projection mode when the electronic device is in the stationary state, when electronic device is switched from the motion state to the stationary state, the projection module may be controlled to maintain the non-projection mode. When the instruction which triggers the projection module to be switched to the projection mode is received, the projection module is switched from the non-projection mode to the projection mode.

In a ninth embodiment, in the case where the projection module is in the non-projection state when the variation in the motion parameter indicates that the electronic device is switched from the stationary state to the motion state, the application (corresponding to the first application, the content of which is projected and displayed by the projection module) is controlled to stop content output. In the case where the projection module is in the projection state when the variation in the motion parameter indicates that the electronic device is switched from the motion state to the stationary state, the application (corresponding to the second application, the content of which is stopped from being projected and displayed by the projection module; in the embodiment, the second application is the same as the first application) is controlled to continue with content output. (A combination of claim 4, claim 5, claim 6 and claim 7.)

Figure 11:
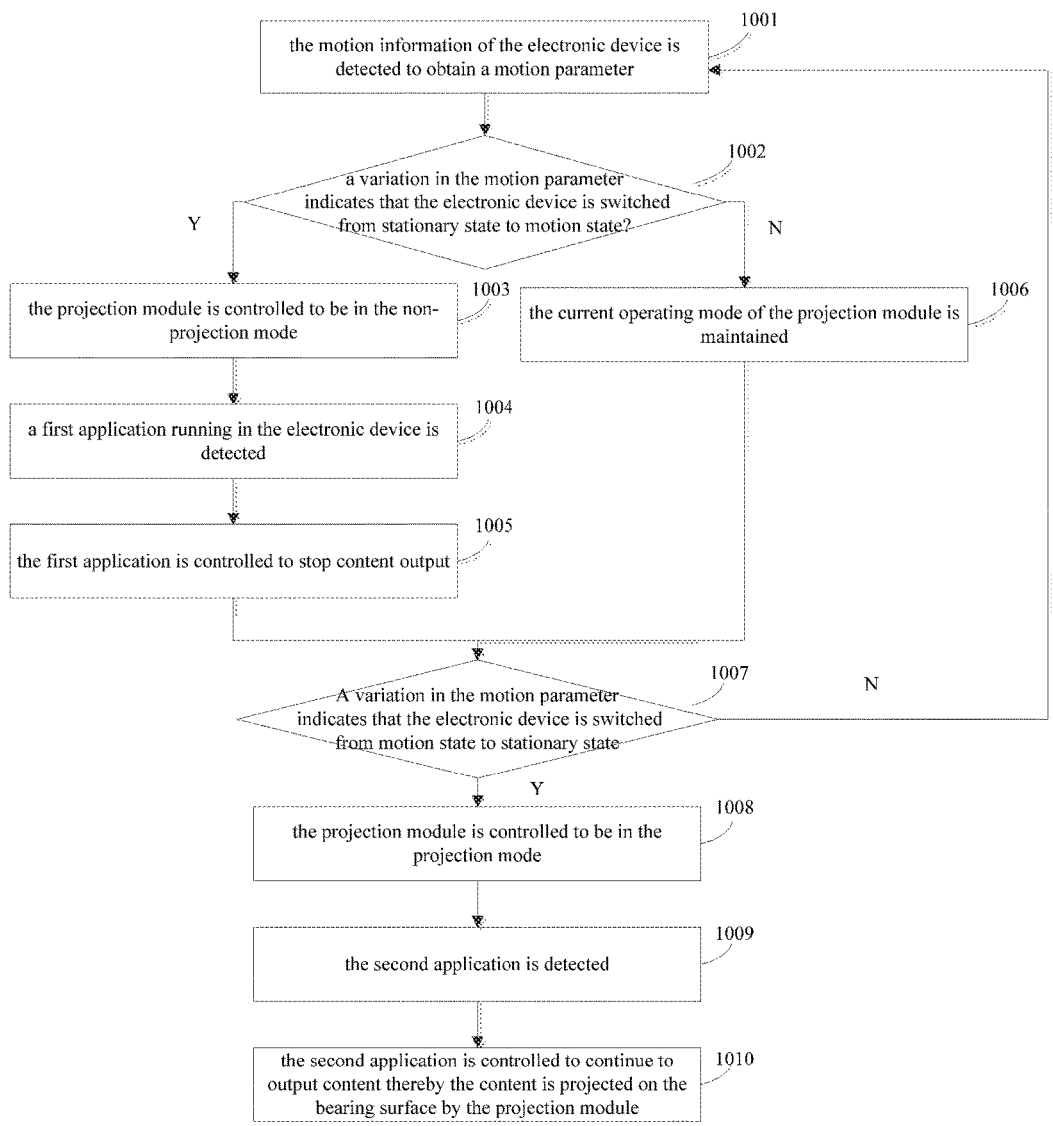
FIG. 11 is a schematic flow chart of an implementation of a projection method according to a tenth embodiment of the disclosure.

A projection method described in this embodiment is applicable to an electronic device such as a smart phone or a tablet. A projection module is provided in the electronic device. As shown in FIGS. 2*a* and 2*b*, the apparatus supports projecting content (for example, multimedia information or text information) to a bearing surface (for example, a table surface, a wall surface, or a projection screen) with the projection module. As shown in FIG. 11 the information processing method described in this embodiment includes the following steps 1001 to 1010.

In step 1001, the motion information of the electronic device is detected to obtain a motion parameter.

In practice, the electronic device may obtain the motion parameter of the electronic device by periodically analyzing sensor data output by a built-in sensor such as a gyroscope or a gravity sensor. The motion parameter may indicate at least one of the following information: whether the electronic device is moving, a moving speed of the electronic device, an acceleration of the electronic device; and a motion trajectory of the electronic device.

In step 1002, it is determined whether a variation in the motion parameter indicates that the electronic device is switched from the stationary state to the motion state. Steps 1003 to 1005 are executed if the variation in the motion parameter indicates that the electronic device is switched from the stationary state to the motion state, step 106 is executed if the variation in the motion parameter indicates that the electronic device is not switched from the stationary state to the motion state.

In step 1003, the projection module is controlled to be in the non-projection mode.

In step 1004, a first application running in the electronic device is detected.

The first application is the application the content of which is projected and displayed by the projection module, such as a multimedia player or a game application.

In step 1005, the first application is controlled to stop content output.

For example, in the case where the first application is a video player playing a movie, the video player is triggered to pause. In the case where the first application is a game application, the state where the game application stops running and the game screen becomes static is triggered.

The process of steps 1003 to 1005 includes the following two conditions, as explained below by way of examples.

In a first condition, when the variation in the motion parameter indicates that the electronic device is switched from the stationary state to the motion state, the projection module is in the non-projection mode where no light beam is projected by the projection module. In this case, the projection module is maintained in the non-projection mode to avoid the light beam projected from the projection module being projected towards human eyes.

In a second condition, when the variation in the motion parameter indicates that the electronic device is switched from the stationary state to the motion state, the projection module is in the projection mode where the content is projected and displayed on the bearing surface by the projection module. In this case, the projection module is controlled to switch from the projection mode to the non-projection mode, where the projection module is stopped from projecting the light beam to avoid the light beam projected from the projection module being projected towards human eyes. Meanwhile, the first application is detected and controlled to stop content output.

In step 1006, the current operating mode of the projection module is maintained.

For example, in the case where the projection module is in the projection mode, the projection module is maintained in the projection mode to project and display the content on the bearing surface. In the case where the projection module is in the non-projection mode, the projection module is maintained in the non-projection mode to avoid the light beam projected from the projection module being projected towards human eyes.

In step 1007, the motion information of the electronic device is detected in continuation to obtain a motion parameter; then it is determined whether a variation in the motion parameter indicates that the electronic device is switched from the motion state to the stationary state. Steps 1008 to 1010 are executed if the variation in the motion parameter indicates that the electronic device is switched from the motion state to the stationary state; the process returns to step 1001 if the variation in the motion parameter indicates that the electronic device is not switched from the motion state to the stationary state.

In step 1008, the projection module is controlled to be in the projection mode.

In step 1009, the second application is detected.

The second application is the application a content of which is stopped from being projected and displayed by the projection module. The second application corresponds the first application.

In step 1010, the second application is controlled to continue to output content thereby the content is projected on the bearing surface by the projection module.

The second application may be controlled to output the content from the point where it was stopped according to the play progress, thereby continue-play of the content may be implemented by the projection module. Of course, the second application may also be controlled to output the content from the beginning.

Steps 1008 to 1010 also includes the following two conditions corresponding to the two conditions of step 1003.

Corresponding to the above first condition where the projection module is in the non-projection mode when the variation in the motion parameter indicates that the electronic device is switched from the stationary state to the motion state, when a subsequent variation in the motion parameter indicates that the electronic device is switched from the motion state to the stationary state, the projection module may be controlled to switch from the non-projection mode to the projection mode. (Alternatively, when a subsequent variation in the motion parameter indicates that the electronic device is switched from the motion state to the stationary state, and when an instruction which enables the projection module is received, the projection module may be controlled to switch from the non-projection mode to the projection mode.)

Corresponding to the above second condition where the projection module is in the projection mode when the variation in the motion parameter indicates that the electronic device is switched from the stationary state to a motion state, when a subsequent variation in the motion parameter indicates that the electronic device is switched from the motion state to the stationary state, the projection module may be controlled to switch from the non-projection mode to the projection mode, and the second application is detected and controlled to continue to output content thereby the content is projected on the bearing surface by the projection module.

It should be noted that, the above steps may be executed periodically, thereby the determination whether the electronic device is switched between the stationary state and the motion state may be made timely and a corresponding process may be performed, as explained below by way of examples.

1) The motion parameter is obtained when the video played by the video player in the electronic device is projected and displayed on the bearing surface by the projection module. In the case where the variation in the motion parameter indicates that the electronic device is switched from the stationary state to the motion state, the projection module is switched to the non-projection mode to avoid the light beam projected from the projection module being projected towards human eyes. In addition, the video player is controlled to stop video content output, and a current play progress of the video content may be recorded. Then in the case where the motion parameter indicates that the electronic device is switched from the motion state to the stationary state, the projection module is controlled to switch from the non-projection mode to the projection mode, and the video player may be controlled to output the content from the point where it was stopped according to the play progress, thereby the content may continue to be projected and displayed on the bearing surface by the projection module, and continue-play of the multimedia content may be implemented.

2) The motion parameter is obtained when the projection module of the electronic device is in the non-projection mode where no content is projected and displayed on the bearing surface by the projection module. In the case where the variation in the motion parameter indicates that the electronic device is switched from the stationary state to the motion state, the projection module is maintained in the non-projection mode to avoid the light beam projected from the projection module being projected towards human eyes. In addition, the instruction triggering the projection module to be switched to the projection mode may be screened until the variation in the motion parameter indicates that the electronic device is switched from the motion state to the stationary state. At this moment, the projection module is controlled to switch from the non-projection mode to the projection mode in the case where the instruction enabling the projection module is received, thereby the content may be projected and displayed on the bearing surface by the projection module.

This embodiment may achieve the following technical effect. The projection module is ensured in the non-projection mode when the electronic device is switched from the stationary state to the motion state. For example the projection module may be controlled to switch to the non-projection mode when the projection module is in the projection mode, and the first application is controlled to stop content output and the instruction triggering the projection module to be switched to the projection mode may be screened. In the case where the projection module is in the projection mode when the electronic device is previously in the stationary state, when electronic device is switched from the motion state to the stationary state, the projection module may be controlled to switch from the non-projection mode to the projection mode, and the second application (corresponding to the first application) is controlled to continue with content out put, to continue with the projection and display of the content by the projection module. In the case where the projection module is in the non-projection mode when the electronic device is previously in the stationary state, when electronic device is switched from the motion state to the stationary state, the projection module may be controlled to maintain the non-projection mode. When the instruction which triggers the projection module to be switched to the projection mode is received, the projection module is switched from the non-projection mode to the projection mode.

In a tenth embodiment, the projection module is controlled to be in a non-projection mode in the case where the motion trajectory of the electronic device matches the predetermined motion trajectory.

Figure 12:
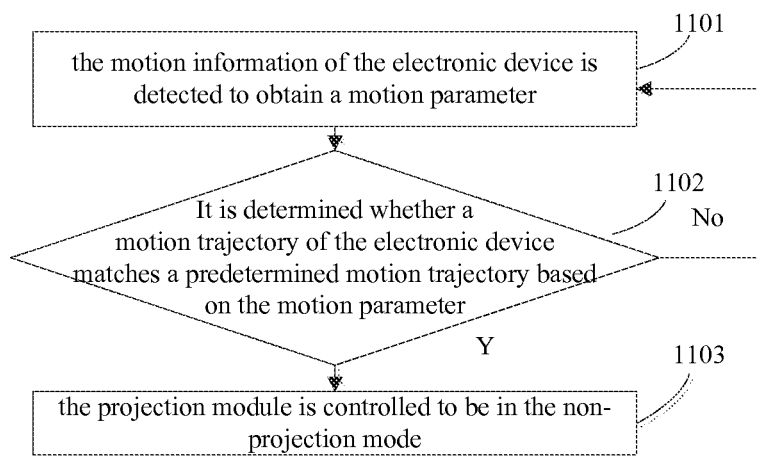
FIG. 12 is a schematic flow chart of an implementation of a projection method according to an eleventh embodiment of the disclosure.

A projection method described in this embodiment is applicable to an electronic device such as a smart phone or a tablet. A projection module is provided in the electronic device. As shown in FIGS. 2*a* and 2*b*, the apparatus supports projecting content (for example, multimedia information or text information) to a bearing surface (for example, a table surface, a wall surface, or a projection screen) with the projection module. As shown in FIG. 12 the information processing method described in this embodiment includes the following steps 1101 to 1103.

In step 1101, the motion information of the electronic device is detected to obtain a motion parameter.

In practice, the electronic device may obtain the motion parameter of the electronic device by periodically analyzing sensor data output by a built-in sensor such as a gyroscope or a gravity sensor. The motion parameter may indicate at least one of the following information: whether the electronic device is moving, a moving speed of the electronic device, an acceleration of the electronic device; and a motion trajectory of the electronic device.

In step 1102, it is determined whether a motion trajectory of the electronic device matches a predetermined motion trajectory based on the motion parameter, step 1103 is executed in the case where the motion trajectory of the electronic device matches the predetermined motion trajectory; the process returns to step 1101 in the case where the motion trajectory of the electronic device does not match the predetermined motion trajectory.

The predetermined motion trajectory may correspond to trajectories of the electronic device in different application scenes. For example, the predetermined motion trajectory may correspond to the motion trajectory when the user holds the electronic device close to the ear to answer a phone call. Alternatively, the predetermined motion trajectory may correspond to the motion trajectory of the electronic device when the electronic device is turned over.

In step 1103, the projection module is controlled to be in the non-projection mode.

Step 1103 includes the following two conditions.

In a first condition, in the case where the projection module is in the non-projection mode when the electronic device is previously in the stationary state, the projection module may be controlled to maintain the non-projection mode if the motion trajectory of the electronic device matches the predetermined motion trajectory.

In a second condition, in the case where the projection module is in the projection mode when the electronic device is previously in the stationary state, the projection module is controlled to switch from the projection mode to the non-projection mode if the motion trajectory of the electronic device matches the predetermined motion trajectory.

It should be noted that, the above steps may be executed periodically, thereby the determination whether the electronic device is switched between the stationary state and the motion state may be made timely and a corresponding process may be performed, as explained below by way of examples.

In a first example, the motion parameter is obtained when the content is projected and displayed on the bearing surface with the electronic device being positioned on a carrier (for example, a desktop). If the motion trajectory of the electronic device matches the motion trajectory where the user picks up the electronic device close to the ear to answer a phone call, which indicates that the user needs to make a phone call during the projection, the projection module is switched from the projection mode to the non-projection mode to avoid the light beam projected from the projection module being projected towards human eyes. Then in the case where the motion parameter indicates that the electronic device is switched from the motion state to the stationary state, the projection module is controlled to switch from the non-projection mode to the projection mode, thereby the content may continue to be projected and displayed on the bearing surface by the projection module.

In a second example, the motion parameter is obtained when the content is projected and displayed on the bearing surface with the electronic device being positioned on a carrier (for example, a desktop). If the motion trajectory of the electronic device matches the motion trajectory where the electronic device is turned over by the user (the operation of turning over the electronic is predetermined to trigger a pause in the projection), which indicates that the user needs to stop the projection, the projection module is switched from the projection mode to the non-projection mode to avoid the light beam projected from the projection module being projected towards human eyes. Then in the case where the motion parameter indicates that the electronic device is switched from the motion state to the stationary state, the projection module is controlled to switch from the non-projection mode to the projection mode, thereby the content may continue to be projected and displayed on the bearing surface by the projection module.

In an eleventh embodiment, the projection module is controlled to be in a non-projection mode in the case where the motion trajectory of the electronic device matches the predetermined motion trajectory.

A projection method described in this embodiment is applicable to an electronic device such as a smart phone or a tablet. A projection module is provided in the electronic device. As shown in FIGS. 2a and 2b, the apparatus supports projecting content (for example, multimedia information or text information) to a bearing surface (for example, a table surface, a wall surface, or a projection screen) with the projection module. As shown in FIG. 12 the information processing method described in this embodiment includes the following steps 1101 to 1103.

In step 1101, the motion information of the electronic device is detected to obtain a motion parameter.

In practice, the electronic device may obtain the motion parameter of the electronic device by periodically analyzing sensor data output by a built-in sensor such as a gyroscope or a gravity sensor. The motion parameter may indicate at least one of the following information: whether the electronic device is moving, a moving speed of the electronic device, an acceleration of the electronic device; and a motion trajectory of the electronic device.

In step 1102, it is determined whether a motion trajectory of the electronic device matches a predetermined motion trajectory based on the motion parameter, step 1103 is executed in the case where the motion trajectory of the electronic device matches the predetermined motion trajectory; the process returns to step 1101 in the case where the motion trajectory of the electronic device does not match the predetermined motion trajectory.

The predetermined motion trajectory may correspond to trajectories of the electronic device in different application scenes. For example, the predetermined motion trajectory may correspond to the motion trajectory when the user picks up the electronic device close to the ear to answer a phone call. Alternatively, the predetermined motion trajectory may correspond to the motion trajectory of the electronic device when the electronic device is turned over.

In step 1103, the projection module is controlled to switch between the projection mode and the non-projection mode.

Two conditions are included: the projection module is controlled to switch from the projection mode to the non-projection mode, and the projection module is controlled to switch from the non-projection mode to the projection mode.

For example, in the case where the projection module is in the projection mode, if the motion trajectory of the electronic device matches a first predetermined motion trajectory (the motion trajectory where the user picks up the electronic device close to the ear to answer a phone call, which indicates that the user needs to make a phone call with the electronic device), the projection module is adjusted to switch from the projection mode to the non-projection mode, where the projection and display of the content on the bearing surface by the projection module is stopped. Then if the motion trajectory of the electronic device matches a second predetermined motion trajectory (the motion trajectory where the electronic device is positioned on the carrier such a desktop from the position close to the ear, which indicates that the user is no longer using the electronic device), the projection module is adjusted to switch from the non-projection mode to the projection mode, thereby the projection module may be switched between the projection mode and the non-projection mode automatically according to the application scene.

In a twelfth embodiment, the projection module is controlled to switch between the non-projection mode and the projection mode in the case where the motion trajectory of the electronic device matches the predetermined motion trajectory.

Figure 13:
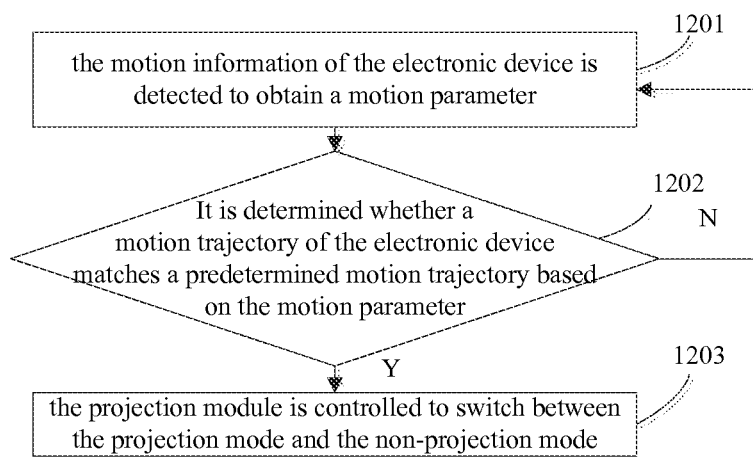
FIG. 13 is a schematic flow chart of an implementation of a projection method according to a twelfth embodiment of the disclosure.

A projection method described in this embodiment is applicable to an electronic device such as a smart phone or a tablet. A projection module is provided in the electronic device. As shown in FIGS. 2a and 2b, the apparatus supports projecting content (for example, multimedia information or text information) to a bearing surface (for example, a table surface, a wall surface, or a projection screen) with the projection module. As shown in FIG. 13 the information processing method described in this embodiment includes the following steps 1201 to 1203.

In step 1201, the motion information of the electronic device is detected to obtain a motion parameter.

In practice, the electronic device may obtain the motion parameter of the electronic device by periodically analyzing sensor data output by a built-in sensor such as a gyroscope or a gravity sensor. The motion parameter may indicate at least one of the following information: whether the electronic device is moving, a moving speed of the electronic device, an acceleration of the electronic device; and a motion trajectory of the electronic device.

In step 1202, it is determined whether a motion trajectory of the electronic device matches a predetermined motion trajectory based on the motion parameter, step 1203 is executed in the case where the motion trajectory of the electronic device matches the predetermined motion trajectory; the process returns to step 1201 in the case where the motion trajectory of the electronic device does not match the predetermined motion trajectory.

The predetermined motion trajectory may correspond to trajectories of the electronic device in different application scenes. For example, the predetermined motion trajectory may correspond to the motion trajectory when the user picks up the electronic device close to the ear to answer a phone call. Alternatively, the predetermined motion trajectory may correspond to the motion trajectory of the electronic device when the electronic device is turned over.

In step 1203, the projection module is controlled to switch between the projection mode and the non-projection mode.

Two conditions are included: the projection module is controlled to switch from the projection mode to the non-projection mode, and the projection module is controlled to switch from the non-projection mode to the projection mode.

For example, in the case where the projection module is in the projection mode, if the motion trajectory of the electronic device matches a first predetermined motion trajectory (the motion trajectory where the user picks up the electronic device close to the ear to answer a phone call, which indicates that the user needs to make a phone call with the electronic device), the projection module is adjusted to switch from the projection mode to the non-projection mode, where the projection and display of the content on the bearing surface by the projection module is stopped. Then if the motion trajectory of the electronic device matches a second predetermined motion trajectory (the motion trajectory where the electronic device is positioned on the carrier such a desktop from the position close to the ear, which indicates that the user is no longer using the electronic device), the projection module is adjusted to switch from the non-projection mode to the projection mode, thereby the projection module may be switched between the projection mode and the non-projection mode automatically according to the application scene.

In a thirteenth embodiment, the projection parameter of the projection module is adjusted in the case where the motion trajectory of the electronic device matches the predetermined motion trajectory.

Figure 14:
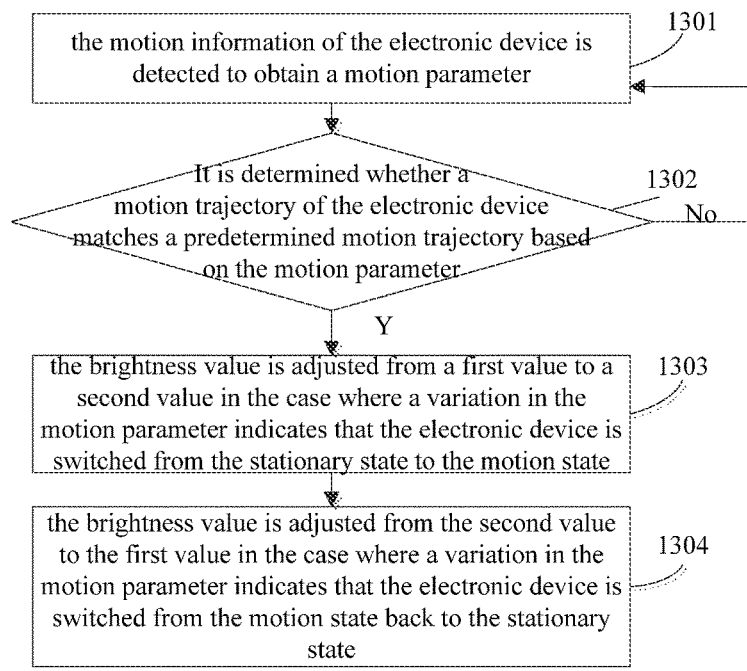
FIG. 14 is a schematic flow chart of an implementation of a projection method according to a thirteenth embodiment of the disclosure.

A projection method described in this embodiment is applicable to an electronic device such as a smart phone or a tablet. A projection module is provided in the electronic device. As shown in FIGS. 2a and 2b, the apparatus supports projecting content (for example, multimedia information or text information) to a bearing surface (for example, a table surface, a wall surface, or a projection screen) with the projection module. As shown in FIG. 14 the information processing method described in this embodiment includes the following steps 1301 to 1304.

In step 1301, the motion information of the electronic device is detected to obtain a motion parameter.

In practice, the electronic device may obtain the motion parameter of the electronic device by periodically analyzing sensor data output by a built-in sensor such as a gyroscope or a gravity sensor. The motion parameter may indicate at least one of the following information: whether the electronic device is moving, a moving speed of the electronic device, an acceleration of the electronic device; and a motion trajectory of the electronic device.

In step 1302, it is determined whether a motion trajectory of the electronic device matches a predetermined motion trajectory based on the motion parameter, step 1303 is executed in the case where the motion trajectory of the electronic device matches the predetermined motion trajectory; the process returns to step 1301 in the case where the motion trajectory of the electronic device does not match the predetermined motion trajectory.

The predetermined motion trajectory may correspond to trajectories of the electronic device in different application scenes. For example, the predetermined motion trajectory may correspond to the motion trajectory when the user picks up the electronic device close to the ear to answer a phone call. Alternatively, the predetermined motion trajectory may correspond to the motion trajectory of the electronic device when the electronic device is turned over.

Subsequently, a projection parameter of the projection module is adjusted in the case where it is determined in step 1302 that the motion parameter indicates that the motion trajectory of the electronic device matches the predetermined motion trajectory. The case where the projection parameter is a brightness value which indicates the brightness of the light beam projected from the projection module is taken as an example.

In step 1303, the brightness value is adjusted from a first value (brightness value before the adjustment) to a second value in the case where a variation in the motion parameter indicates that the electronic device is switched from the stationary state to the motion state, where the first value is greater than the second value.

When the variation in the motion parameter indicates that the electronic device is switched from the stationary state to the motion state, which may be caused by the user holding the electronic device and forgetting to turn off the projection module, the brightness value is adjusted from a first value to a second value which is smaller than the first value thereby preventing the projected light beam from being projected towards human eyes. The second value may be the brightness value when the light resource of the projection module is approximately closed to avoid the projected light beam being projected towards human eyes.

In step 1304, the brightness value is adjusted from the second value to the first value in the case where a variation in the motion parameter indicates that the electronic device is switched from the motion state back to the stationary state.

It should be noted that, in step 1304, in the case where the brightness value used by the projection module in performing the projection is adjusted from the first value to the second value, the following processes may be adopted if the content projected and displayed on the bearing surface with the first value by the projection module is dynamic (for example, a movie).

1) The content may be projected and displayed continuously on the bearing surface with the second value by the projection module. For example, in the case where a multimedia content is projected and displayed with the projection module, the content may be projected and displayed continuously on the bearing surface with the second value by the projection module when the electronic device is switched from the stationary state to the motion state. The following technical effect may be achieved: the content may be projected and displayed continuously on the bearing surface by the projection module when the electronic device is switched from the stationary state to the motion state; meanwhile, the brightness value of the content projected and displayed is reduced to a brightness which will not cause damage to human eyes.

2) A stationary screen of the content is projected and displayed with the second value by the projection module. The stationary screen of the content is a snapshot of the content projected and displayed by the projection module at the time point when the electronic is switched from the stationary state to the motion state, that is, the content is stopped from being projected and displayed dynamically and only a stationary screen is projected and displayed. In step 1304, when the variation in the motion parameter indicates that the electronic device is switched from the motion state back to the stationary state, the brightness value is adjusted from the second value to the first value. The content continues to be projected and displayed on the bearing surface with the first value by the projection module based on the stationary screen, that is, the content continues to be displayed on the bearing surface with the progress where the content was stopped from projected and displayed dynamically.

For example, in the case where a multimedia content is projected and displayed by the projection module, if the variation in the motion parameter indicates that the electronic device is switched from the stationary state to the motion state when the play progress of the multimedia content reaches 20%, the stationary screen corresponding to the multimedia content played at 20% progress is projected and displayed with the second value by the projection module (i.e., the stationary screen is projected and displayed with a brightness which will not cause damage to human eyes.). When the variation in the motion parameter indicates that the electronic device is switched from the motion state to the stationary state, the multimedia content continues to be projected and displayed with the first value from the 20% progress by the projection module. Therefore the following technical effect is achieved: the projection module does not need to be turned off before the user moves the electronic device to adjust the projection direction and/or projection area, the brightness of the light beam projected from the projection module may be reduced by the electronic device automatically. After the user finishing the adjustment, the brightness of the light beam projected from the projection module may be restored to continue with the projection and display of the content, thereby preventing the intense projected beam from being projected towards human eyes, user operation may be simplified and the user experience is enhanced.

Figure 15:
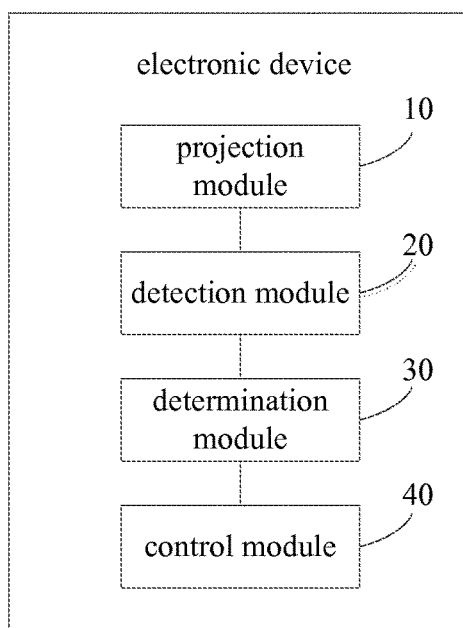
FIG. 15 is a schematic structural diagram of an electronic device according to an embodiment of the disclosure.

In a fourteenth embodiment, an electronic device provided with a projection module 10 is described. As shown in FIGS. 2a and 2b, the electronic device supports projecting content (for example, multimedia information or text information) to a bearing surface (for example, a table surface, a wall surface, or a projection screen) with the projection module 10. As shown in FIG. 15, the electronic device described in this embodiment further includes:

a detection module 20, which is adapted to detect motion information of the electronic device to obtain a motion parameter;

a determination module 30, which is adapted to determine whether the motion parameter meets a predetermined condition; and a control module 40, which is adapted to adjust an operating state of the projection module to match a current motion state of the electronic device if the motion parameter meets the predetermined condition.

Preferably, the determination module 30 is adapted to determine whether the motion parameter indicates that the electronic device is switched between the stationary state and the motion state; or determine whether a motion amplitude of the electronic device indicated by the motion parameter exceeds a predetermined amplitude.

Preferably, the control module 40 is further adapted to adjust the projection module to switch between a projection mode and a non-projection mode; or adjust a projection parameter used by the projection module for performing projection.

Preferably, the control module 40 is further adapted to control the projection module to be in a non-projection state if a variation in the motion parameter indicates that the electronic device is switched from the stationary state to the motion state.

Preferably, the detection module 20 is further adapted to detect a first application running in the electronic device, the content of which is projected and displayed by the projection module; and the control module 40 is further adapted to control the first application to stop content output.

Preferably, the control module 40 is further adapted to control the projection module to be in a projection state if a variation in the motion parameter indicates that the electronic device is switched from the motion state to the stationary state.

Preferably, the detection module 20 is further adapted to detect a second application, a content of which is stopped from being projected and displayed by the projection module; and the control module 40 is further adapted to control the second application to continue to output content where the content is projected on the bearing surface by the projection module.

Preferably, the control module 40 is further adapted to adjust the brightness value from a first value to a second value, where the projection brightness indicated by the first value is different from the projection brightness indicated by the second value.

Preferably, the control module 40 is further adapted to adjust the brightness value from the first value to the second value if a variation in the motion parameter indicates that the electronic device is switched from the stationary state to the motion state, where the first value is greater than the second value.

Preferably, the control module 40 is further adapted to adjust the brightness value from the first value to the second value if a variation in the motion parameter indicates that the electronic device is switched from the motion state to the stationary state, where the first value is smaller than the second value.

Preferably, the control module 40 is further adapted to determine whether a motion trajectory of the electronic device matches a predetermined motion trajectory according to the motion parameter; and control the projection module to be in a non-projection mode if the motion trajectory of the electronic device matches the predetermined motion trajectory.

Preferably, the determination module 30 is further adapted to determine whether a motion trajectory of the electronic device matches a predetermined motion trajectory according to the motion parameter; and determine that the motion parameter meets the predetermined condition if the motion trajectory of the electronic device matches the predetermined motion trajectory.

In practice, the projection module 10 may be implemented with a projection integrated circuit chip (including a reflector and a microprocessor). The detection module 20, the determination module 30, and the control module 40 may be implemented with the microprocessor, a logic programmable gate array (FPGA) or an application specific integrated circuit (ASIC) in the electronic device.

It should be understood by those skilled in the art that all or some of the steps for implementing the above method embodiment may be implemented by hardware related to programs and instructions. The programs may be stored in a computer-readable medium, which when executed causes to perform the steps of the above method embodiment. The storage medium described above includes various medium in which programs and codes can be stored, such as mobile storage, ROM, RAM, magnetic disk or optical disk.

Alternatively, in the case where the above integrated units of the disclosure is implemented in a form of soft functional module and sold or used as a separate product, the units can also be stored in a computer-readable storage medium. With this understanding, the technical solution of the embodiment of the disclosure essentially or the part thereof that contributes to the prior art can be embodied in a soft product which is stored in a storage medium in which several instructions are contained for causing a computer device (such as a personal computer, a server or a networking device) to implement all or a part of the method according to the embodiments of the disclosure. The storage medium described above includes various medium in which programs and codes can be stored, such as mobile storage, Read-Only Memory (ROM), Random Access Memory (RAM), magnetic disk or optical disk.

The above are only embodiments of the disclosure, and the scope of protection of the disclosure is not limited thereto. Any variations or alternations that can be conceived by those skilled in the art within the scope of the technique disclosed in the disclosure fall within the scope of protection or the disclosure. Therefore, the protection scope of the disclosure should be subjected to the protection scope defined in the claims.

The invention claimed is:

1. A projection method of an electronic device having a projection module, the method comprising:
    detecting motion information of the electronic device to obtain a first motion parameter;
    determining whether the electronic device is switched from a stationary state to a motion state or from the motion state to the stationary state based on the motion parameter;
    if the motion parameter indicates that the electronic device is switched from the stationary state to the motion state,
    controlling the projection module to be in a non-projection state, and recording a play progress of a content projected by the projection module; and
    if the motion parameter indicates that the electronic device is switched from the motion state to the stationary state, controlling the projection module to be in a projection state, and adjusting a brightness value of the projection module from a first value to a second value, wherein the first value is less than the second value.

2. The method according to claim 1, further comprising detecting the motion information of the electronic device to obtain a second motion parameter;
    determining whether the electronic device is switched from the motion state to the stationary state based on the second motion parameter; and
    controlling the projection module to be in a projection state and playing the content based on the play progress, if the second motion parameter indicates that the electronic device is switched from the motion state to the stationary state.

3. The method according to claim 1 wherein an application runs in the electronic device, and content of the application is projected by the projection module, the method comprises:
    suspending the running of the application if the electronic device is switched from the stationary state to the motion state; and
    continuing the running of the application if the electronic device is switched from the motion state to the stationary state.

4. The method according to claim 1, further comprising:
    determining whether a motion trajectory of the electronic device matches a predetermined motion trajectory according to the motion parameter; and
    adjusting the operating state of the projection module to match the motion state of the electronic device, if the motion trajectory of the electronic device matches the predetermined motion trajectory.

5. An electronic device comprising:
    a projection module; and
    a processor configured to:
    detect motion information of the electronic device to obtain a first motion parameter;
    determine whether the electronic device is switched from a stationary state to a motion stat or from the motion state to the stationary state based on the motion parameter;
    if the motion parameter indicates that the electronic device is switched from the station state to the motion state,
    control the projection module to be in a non-projection state, and record a play progress of a content projected by the projection module; and
    if the motion parameter indicates that the electronic device is switched from the motion state to the stationary state, control the projection module to be in a projection state, and adjust a brightness value of the projection module from a first value to a second value, wherein the first value is less than the second value.

6. The electronic device according to claim 5, wherein the processor is further configured to:
    detect the motion information of the electronic device to obtain a second motion parameter;
    determine whether the electronic device is switched from the motion state to the stationary state based on the second motion parameter; and
    control the projection module to be in a projection state and play the content based on the play progress, if the second motion parameter indicates that the electronic device is switched from the motion state to the stationary state.

7. The electronic device according to claim 5 wherein an application runs in the electronic device and content of the application is projected by the projection module, the processor is configured to:
- suspend the running of the application if the electronic device is switched from the stationary state to the motion state; and
- continue the running of the application if the electronic device is switched from the motion state to the stationary state.

8. The electronic device according to claim 5, wherein the processor is further configured to:
- determine whether a motion trajectory of the electronic device matches a predetermined motion trajectory; and
- adjust the operating state of the projection module to match the motion state of the electronic device, if the motion trajectory matches the predetermined motion trajectory.

9. The electronic device according to claim 8, wherein the processor is further configured to control the projection module to be in a non-projection mode if the motion trajectory of the electronic device matches the predetermined motion trajectory.

* * * * *